United States Patent [19]
Chan

[11] Patent Number: 6,101,514
[45] Date of Patent: *Aug. 8, 2000

[54] ANTI-ALIASING APPARATUS AND METHOD WITH AUTOMATIC SNAP FIT OF HORIZONTAL AND VERTICAL EDGES TO TARGET GRID

[75] Inventor: Allen M. Chan, Cupertino, Calif.

[73] Assignee: Apple Computer, Inc., Cupertino, Calif.

[*] Notice: Under 35 U.S.C. 154(b), the term of this patent shall be extended for 1108 days.

[21] Appl. No.: 08/653,978

[22] Filed: May 28, 1996

Related U.S. Application Data

[63] Continuation of application No. 08/074,754, Jun. 10, 1993, abandoned.

[51] Int. Cl.$^7$ ............................................. G06F 17/21
[52] U.S. Cl. ............................................. 707/530
[58] Field of Search ........................ 395/150, 167–172; 707/530

[56] References Cited

U.S. PATENT DOCUMENTS

| | | | |
|---|---|---|---|
| 4,437,122 | 3/1984 | Walsh et al. | 358/456 |
| 5,249,242 | 9/1993 | Hanson et al. | 358/447 |
| 5,270,836 | 12/1993 | Kang | 358/459 |
| 5,301,267 | 4/1994 | Hassett et al. | 395/150 |
| 5,459,828 | 10/1995 | Zack et al. | 395/151 |

*Primary Examiner*—Stephen S. Hong
*Assistant Examiner*—Cesar B. Paula
*Attorney, Agent, or Firm*—Burns, Doane, Swecker & Mathis, L.L.P.

[57] ABSTRACT

The invention provides a method and apparatus for creating anti-aliasing effects in slanted or curved edge portions of a bit-mapped image while avoiding such effects at horizontal and vertical edge portions. A method in accordance with the invention comprises the steps of: (a) defining a set of plot instructions for plotting an ideal outline of a desired image; (b) identifying a target resolution to be provided by a bit-mapped rendering apparatus; (c) scaling and grid-fitting the outline to the identified target resolution; (d) upwardly scaling the grid-fitted outline to a mezzanine resolution level that is higher than the identified resolution of the target display medium; (e) filling the outline at the mezzanine resolution level (scan conversion); (f) assigning, based on the mezzanine level outline fill, one or more of a grayscale value or other anti-aliasing attribute vales to each corresponding pixel of the target display medium (sampling); and (g) rendering the image in accordance with this attribute assignment onto the target display medium for appreciation by a human observer.

31 Claims, 4 Drawing Sheets

ANTI-ALIASING APPARATUS AND METHOD WITH AUTOMATIC SNAP FIT OF HORIZONTAL AND VERTICAL EDGES TO TARGET GRID

This application is a continuation, of application Ser. No. 08/074,754, filed Jun. 10, 1993 now abandoned.

BACKGROUND

1. Field of the Invention

The invention is generally directed to the problem of rendering graphic images by way of a bit-mapped display means or on bit-mapped media. The invention is more specifically directed to the problem of providing anti-aliasing effects for curved and/or slanted edges of a bit-mapped image.

2. Description of the Related Art

A problem develops when characters such as the Roman letters "A", "B", "C", etc., or other glyphs having slanted and/or curved portions are to be rendered in near-typeset quality by way of a bit-mapped rendering apparatus (e.g. a raster-based CRT or a laser printer). The slanted and/or curved edge portions of the images can not be rendered in ideal form if the resolution of the bit-mapped rendering apparatus or the resolution of a corresponding, bit-mapped display media is below a very high value (e.g., below 1,000 dots per inch).

The finite resolution of many bit-mapped rendering devices (e.g., CRT's, dot-matrix or laser printers) can give the rendition of the slanted and/or curved portions of glyphs such as "A", "B", "C", a jagged appearance instead of a desired smooth appearance.

A variety of techniques have been proposed for minimizing the jagged appearance. Such techniques are generally referred to as "anti-aliasing".

One form of anti-aliasing, which is referred to here as "grayscaling", modulates the intensity or gray scale value of certain individual pixels in a bit-mapped rendition when such pixels are found at and/or near slanted/curved edges of an image. The intensity modulation gives such edges a smooth appearance.

Another form of anti-aliasing, which is referred to here as "fuzzy-font", uses a dither-like methodology. Selected pixels are turned on or off, at and/or near slanted/curved edges to give such edges a "fuzzy" or "hairy" appearance. The human eye is fooled into perceiving fuzzied edges as being "smooth" even though close (e.g., microscopic) inspection would show that such edges contain jagged features.

It is to be understood that the above-described forms are merely examples rather than an exhaustive definition of "anti-aliasing". Those skilled in the art will appreciate the term "anti-aliasing" to be one which covers a broad range of techniques and/or combinations of techniques that are used in the bit-mapped imaging arts to fool the human eye into perceiving smooth rather than jagged contours. Anti-aliasing includes the processes of determining which pixels are to be turned on or off in order to minimize a jagged appearance, as well as determining in the case where a pixel is turned on, what intensity or other attribute (e.g., partial cover area or position offset) is to be further activated for that pixel in order to better minimize any undesired jagged appearances in the overall image.

Previous anti-aliasing approaches have been burdened by the problems of: (a) over-complexity and (b) excessive execution time. Sets of relatively complex, pattern recognition and decision-making rules are typically constructed for letting a computer decide which pixels of the bit-mapped rendering apparatus or display medium are to be turned on or off, and if turned on, at what intensity, size, and/or other anti-alias providing level.

Intensity modulation (grayscaling) is commonly used in CRT displays (cathode ray tubes) and the like where a "z" control is available for convenient modulation of dot intensity independently of "x" and "y" dot placement controls. Dot size modulation is typically used by laser printers and like display means that do not have an independent "z" control.

Over-complexity is disadvantageous in anti-aliasing because it leads to excessive consumption of computer memory space and/or computer hardware resources for the storage and execution of overly-complex rules.

Over-complexity is additionally disadvantageous because it tends to increase execution time. The execution time of a digital processing unit in providing an anti-aliasing effect can become burdensome when the print-out or other display of a to-be-rendered image contains many hundreds or thousands of characters/glyphs, each requiring anti-aliasing. A person who is waiting for the print out or other display output may find it annoying to wait so long. The problem is particularly pervasive for long documents presented in glyphic-intensive scripts such as Japanese Kanji.

SUMMARY OF THE INVENTION

The invention provides a relatively simple apparatus and method for creating anti-aliasing effects in slanted and/or curved edge portions of a bit-mapped image while avoiding the undesired creation of such effects at horizontal and vertical edge portions.

A method in accordance with the invention comprises the steps of: (a) defining a set of plot instructions for plotting an ideal outline of a desired image, character or other glyph, the outline including one or more outline points through which a closed contour passes; (b) identifying a target resolution to be provided by a bit-mapped rendering apparatus in physical terms such as for example, dots per inch (DPI) for X and Y coordinate axes; (c) scaling and grid-fitting the outline to the identified target resolution; (d) upwardly scaling the grid-fitted outline to a mezzanine resolution level that is higher than the identified resolution of the target rendering apparatus; (e) filling the outline at the mezzanine resolution level (scan conversion); (f) assigning, based on the mezzanine level outline fill, one or more anti-aliasing attributes such as a grayscale value, a dot size value, a cover area value and/or asymmetrical orientation value to each corresponding pixel of the target display grid (sampling); and (g) rendering the image in accordance with said assignment onto a target display medium for appreciation by a human observer.

An apparatus in accordance with the invention comprises: (a) storage means for storing a set of plot instructions for plotting an ideal outline of a desired image, character or other glyph; (b) target identifying means for identifying a target resolution to be provided by a bit-mapped rendering apparatus; (c) first scaling means for scaling and grid-fitting the outline data to the identified target resolution; (d) second scaling means for upwardly scaling the grid-fitted outline data to a mezzanine resolution level that is higher than the identified resolution of the target display medium; (e) outline filling means for filling the outline at the mezzanine resolution level defined by the second scaling means; (f) assigning means for assigning, based on the mezzanine level outline fill produced by the outline filling means, one or more anti-aliasing attributes such as a grayscale value, a dot size value, a cover area value and/or an asymmetrical orientation value to each corresponding pixel of the target grid (sampling); and (g) rendering means for rendering the image in accordance with said assignment onto a target display medium for appreciation by a human observer.

BRIEF DESCRIPTION OF THE DRAWINGS

The below detailed description makes reference to the accompanying drawings, in which.

DETAILED DESCRIPTION

Figure 1:
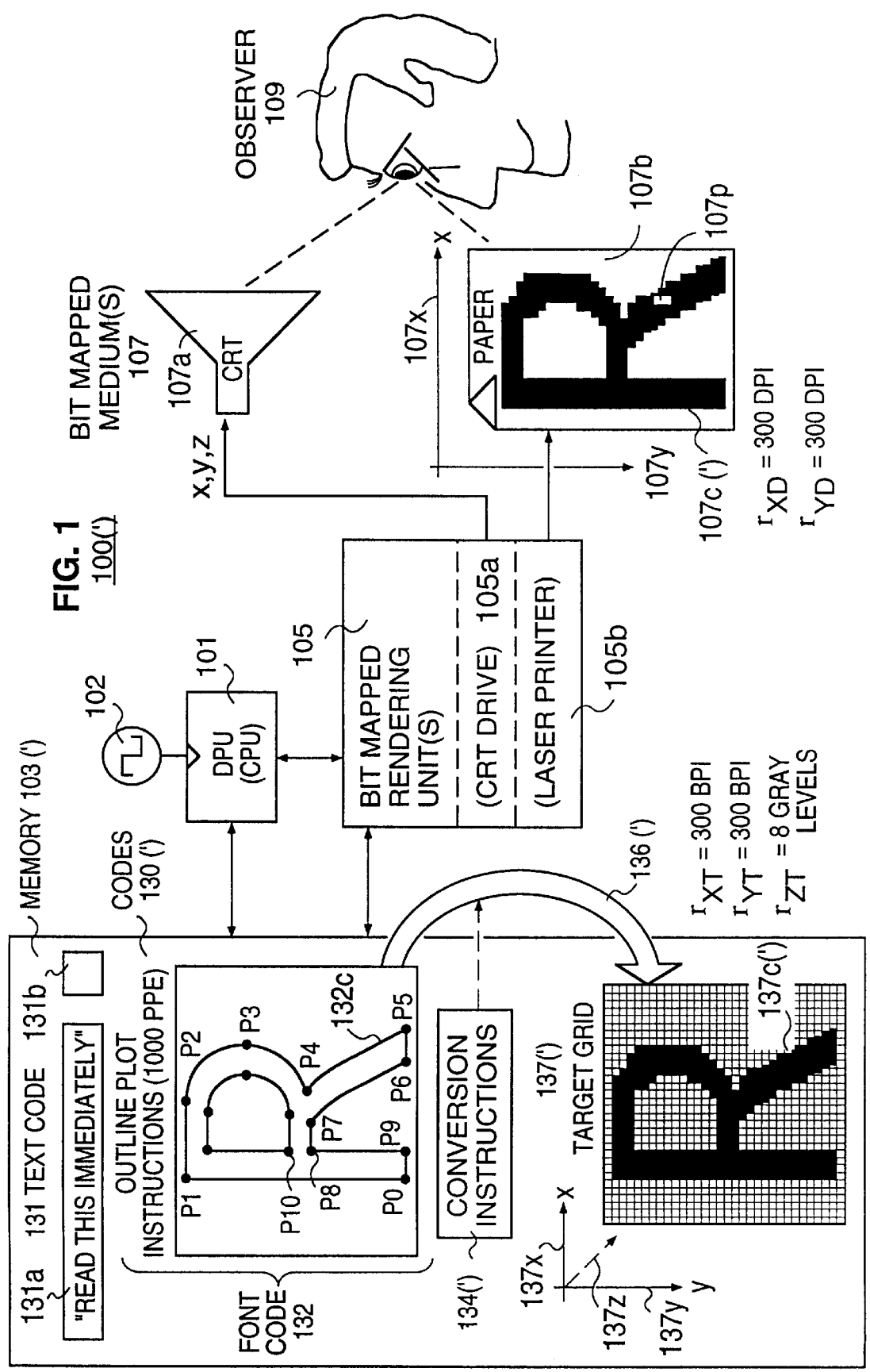
FIG. 1 is a block diagram of an image-rendering system.

FIG. 1 is used to simultaneously diagram two image-rendering systems, 100 and 100'. The unprimed reference number 100 refers to image-rendering systems in general, including prior art. The primed reference number 100' refers to an image-rendering system in accordance with the invention.

Systems 100 and 100' share many common features and as such, their common features are described simultaneously using unprimed reference numbers in the 100–199 number series to denote such shared features. A feature that is differently provided in each of the image-rendering systems 100/100' is parenthetically marked with the suffix "(')" to indicate that there are two distinct versions of that feature, the unprimed one being found in system 100 and the primed one being found in the novel system 100'. The notation 136(') therefore indicates that the unprimed version 136 of the identified element is found in system 100 while the primed version 136' is found in novel system 100'. Systems 100 and 100' are referred to collectively as an image-rendering system 100(').

Now referring to FIG. 1, the illustrated image-rendering system 100(') includes a digital data processing unit (DPU) 101 that operates at a finite processing rate and process digital data. The finite processing rate of the DPU 101 can be established by numerous mechanisms, such as for example, by a system clock (CLK) 102. A data storage unit 103(') is included in the image-rendering system 100(') for storing input and output data of the data processing unit (DPU) 101. The data storage unit 103(') (hereafter, memory unit 103(')) is operatively coupled to the DPU 101.

The digital data processing unit (DPU) 101 can be a microprocessor (CPU) such as a Motorola 68040™ or a like CPU operating at a rate of, for example, 50 MHz, but it is not limited to such an implementation. Other forms of physical hardware which process stored data at a finite rate are included in the definition of a "digital data processing unit (DPU)."

The memory unit 103(') can be implemented as one or more dynamic random access memory (DRAM) chips but is not limited to this specific type of data storage implementation. Memory unit 103(') can also include or be implemented as SRAM (static random access memory), flash-EEPROM (electrically erasable and programmable nonvolatile memory) or by other suitable technologies (e.g., disk plus cache). The primed version 103' may require more storage capacity than the general version 103 for reasons that will be explained in conjunction with FIG. 3.

One or more bit-mapped image rendering units 105 are provided, and operatively coupled to one or both of the DPU 101 and memory unit 103('), for obtaining bit-mapped image data 137(') from the DPU 101 and/or memory unit 103(') and for rendering a corresponding bit-mapped image 107c(') onto a respective one or more image display media 107. Examples of image display media 107 include a cathode ray tube (CRT) 107a and a paper 107b printed by a laser printer. The respective bit-mapped image rendering unit(s) 105 are shown as a CRT driver 105a and a laser printer 105b.

Each character 107c(') or other image that is displayed by one or more of the respective bit-mapped image rendering unit(s) 105 is viewed by a human observer 109 and appreciated through such viewing for its informational and artistic content.

Memory unit 103(') stores a plurality of data structures 130(') for controlling the operations of the DPU 101 and bit-mapped image rendering unit(s) 105 before and/or during rendition of a desired image.

In the case of text, a first such data structure 131 contains text codes for identifying the alphanumeric or other characters to be printed or otherwise displayed. The to-be-rendered text may include a character string such as the string "Read this immediately . . . " shown at 131a.

The text code 131 is often accompanied by print or display control information 131b for defining the font in which the character string 131a is to be rendered (e.g., Courier, Helvetica or Times Roman), for defining the size of the print (e.g., in terms of printer's points or characters per inch) and for defining placement of characters relative to a page corner (absolute positioning) or relative to one another (e.g., proportionally spaced text, left justified, right justified, etc.).

A second data structure 132 in memory unit 103(') contains scalable font code 132 for defining the shapes of various characters (or glyphs) that belong to a selected font in detail. An example of such font code is the TrueType™ font instruction set which is available from Apple Computer, Inc. of Cupertino, Calif. The font code 132 includes outline plot instructions for plotting outlines of desired images, characters or other glyphs. One such outline is shown at 132c for the capital letter "R". The outline plot instructions preferably define the plot at a relatively high resolution such as 1000 or more points per side of a printer's em square.

The outline plot instructions for the illustrated capital-R character 132c can be arranged as shown to define a plurality of outline-defining points $P_0$–$P_{10}$ and one or more lines, arcs, circles or splines passing through, or terminating at, or otherwise relating to these points. The lines, arcs, splines or circles of each outline plot combine to define one or more closed contours which are to be "filled" with a desired color during rendering.

The outline 132c of the capital-R character shown in FIG. 1 has a first point $P_0$ positioned at a first set of coordinates (e.g. X and Y) in a high-precision character space. A vertical line extends up from point $P_0$ to point $P_1$ to define the left vertical edge of the capital-R. (In this particular example it is assumed that the fill color will go on the right side of the contour line $P_0$–$P_1$ as one proceeds from the low-numbered point $P_0$ to the higher-numbered point $P_1$.) A horizontal line extends from point $P_1$ to point $P_2$, to define the top left corner of the capital-R. An arc extends downward to the right from point $P_2$, to and through a next succeeding set of points, $P_3$–$P_4$ to close off the top right, outer edge of the capital-R. A further set of curved and/or slanted, lines and/or splines and a horizontal line extend from $P_4$ to $P_5$ and from there to $P_6$ and $P_7$, to thereby complete definition of the right slanted leg of the capital-R.

A further set of horizontal and vertical lines extend from point $P_7$, through points $P_8$–$P_9$ and back to point $P_0$ for completing the vertical left leg of the capital-R. A closed contour having a D shape passes through additional points $P_{10}$, etc., to define an inner hollow within the shape of the capital-R.

A filled and bit-mapped version of character outline 132c is shown at 137c('). The filled/bit-mapped character image 137c(') is defined in a data buffer referred to here as a target grid 137('). The target grid 137(') is shown to have a bit-mapped, top projection plane onto which there is projected a bit-mapped image represented by the data stored in the target grid buffer 137('). This top projection plane is defined by an X-axis 137x extending in the horizontal direction and a Y-axis 137y extending in the vertical direction. Target grid axes 137x and 137y correspond on a one-bit to one-pixel basis to hypothetical display axes 107x and 107y shown adjacent to image display medium 107b. If the bit-mapped medium 107b has a horizontal display resolution of $r_{xD}$=300 DPI (Dots Per Inch) and a vertical resolution of $r_{yD}$=300 DPI, as an example, then the top plane axes 137x and 137y of the target grid will have corresponding resolutions of $r_{xT}$=300 BPI (Bits Per Representative Inch) and $r_{yT}$=300 BPI. In other words, each bit in the top plane (137x by 137y) of target grid 137 corresponds to a single pixel of the image display medium 107b.

It is to be understood that the target grid 137(') is a data structure stored within memory unit 103(') and that this data structure 137 is formed as a matrix of bits, each of which can be switched to a logic high level ("1") or a logic low level ("0"). For each renderable pixel on the display medium 107, there is at least one corresponding bit in the target grid data structure for indicating whether the pixel on the display medium 107 will be filled or not with some particular color and/or shade.

Some embodiments provide a plurality of bits for each display pixel instead of a single bit per pixel. When this is done, one or more patternings of the plural bits may be used for indicating a grayscale or other controllable characteristic (e.g., color, dot size, relative dot positioning, etc.) of each renderable pixel of the display medium 107. A Z axis (137z) is typically drawn to symbolize the effect of having plural bits in the target grid 137(') for each pixel 107p of the display medium.

Assume for example, that the image rendering unit 105 can render each display pixel 107p at a discrete one of eight selectable grayscale levels. In such a case, a three-bit sequence 000 is typically used to indicate that the display pixel 107p will be set to minimum intensity (e.g., a background white) and the three-bit code 111 is used to indicate that the display pixel 107p will be painted at full intensity (e.g., black). The intermediate 3-bit binary codes, 001, 010, . . . , 110 can be used to define six additional intensity levels between minimum and maximum intensity and these intermediate levels can vary in a linear or other manner, as desired. The Z-axis 137z of the target grid can then be visualized as having 7 discrete levels of intensity for each display pixel in addition to the background level. The 7 levels project to the top x-by-y plane to define the image that will be rendered by the bit-mapped image rendering unit(s) 105.

The transformation from the outline plot instructions 132 to the filled/bit-mapped character image 137c(') in the target grid region 137(') of memory unit 103(') is represented by the arrow-headed symbol for conversion process 136('). Conversion process 136(') is typically carried out partly within memory unit 103(') and partly within data processing unit 101. The symbolic arrow for process 136(') is therefore drawn partly inside and partly outside the box representing memory unit 103(').

Conversion process 136(') operates to convert each character outline 132c into a corresponding bit-mapped character image 137c(') and to store the result in the target grid region 137(') of memory unit 103(').

Although only the outline 132c for the letter capital-R is shown, it is to be understood that the font code region 132 of memory unit 103(') contains outlines for a large number of characters or glyphs (e.g., A–Z, a–z, 0–9, etc.). Conversion process 136(') is carried out for each character or other glyph of text code region 131 that is to be rendered onto a target display medium (e.g., 107a and/or 107b). Lengthy texts call for many repetitions of conversion process 136(').

A set of conversion control instructions 134(') are typically stored within memory unit 103(') for controlling the operations of the DPU 101 and thereby mediating the conversion process 136(').

Once the bits of the target grid data structure 137(') are set to desired logic high or low levels, they are transferred to the image rendering units 105 and used to render the corresponding images on the respective display media 107. In the case where the display medium is a CRT 107a, the CRT driver 105a can output x, y and z signals for respectively defining the x and y positions of each dot and the intensity (z) of each dot. In the case where the image rendering unit is a laser printer 105b, dot intensity and/or size can be controlled through the use of pulse width modulation or the like.

As already mentioned above, in cases where anti-aliasing was to be performed, the prior art generally suffered from complex conversion instructions 134 which disadvantageously consumed large portions of memory unit 103. The prior art further suffered from complex and lengthy conversion processes 136 which consumed excessive time and kept the data processing unit 101 busy performing image rendering tasks when the DPU 101 could have been otherwise used for higher level functions.

The present invention provides a novel conversion process 136' which can be executed in a relatively shorter time and defined by a relatively shorter set of conversion instructions 134'. Vertical and horizontal edges of the bit-mapped character image 137c' (e.g., edges $P_0$–$P_1$ and $P_1$–$P_2$) are automatically snap-fitted to the pixels of the target grid 137' as will be explained below.

Figure 2:
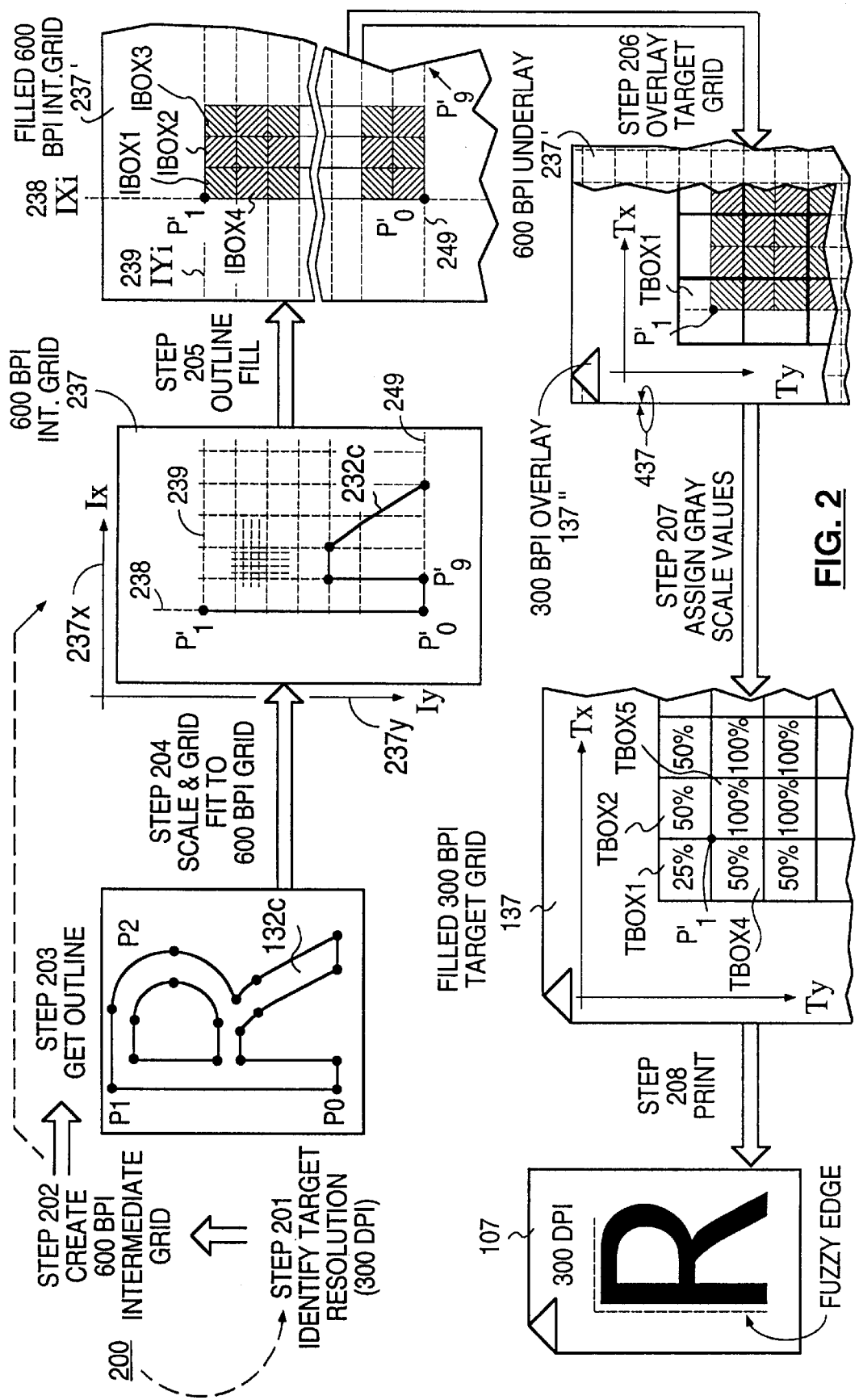
FIG. 2 is a process flow diagram illustrating a grid alignment problem created by an overly-simplified conversion from an outline definition to a corresponding fill of pixels on a target grid.

Referring to FIG. 2, a simple but problem-burdened, process 200 is shown to set the stage for appreciating the present invention. Process 200 is depicted by way of a flow diagram that illustrates how a grid alignment problem is created when a font outline 132c is converted in a simple-minded way from its outline format into a corresponding fill of pixel values on a target grid 137 that supports grayscaling.

At step 201 the resolution of the target device 105 (FIG. 1) that is to render the outline is identified. For purpose of example, it is assumed that the resolution of the rendering unit 105 is 300 DPI along both the X and Y axes (107x and 107y).

At step 202, a data buffer representing an intermediate grid 237 having a resolution that is greater than the resolution of the rendering unit 105, is established in the memory space of memory unit 103. In this example, it is assumed that the intermediate grid resolution is twice that of the target rendering device 105 in both the X and Y directions, although higher resolutions could be used. Accordingly, the intermediate grid 237 has a resolution of 600 BPI (Bits Per Representative Inch) along each of its respective horizontal and vertical axes, 237x and 237y. Dashed vertical line 238 passes through points P'$_1$ and P'$_0$, and represents positions having an integer coordinate value IXi along the horizontal axis 237x of the intermediate grid. Dashed horizontal line 239 passes through point P'$_1$ and denotes positions having an integer coordinate value IYi along the vertical axis 237y of the intermediate grid. Dashed horizontal line 249 passes through point P'$_0$ and represents positions having another integer coordinate value IYj along the vertical axis 237y of the intermediate grid. Due to space limitations, FIG. 2 does not show dashed lines for every integer coordinate value along the vertical and horizontal axes of the intermediate grid. It is to be understood, even though not shown, that the illustrated, and soon-described, points P'$_0$ and P'$_9$ are typically spaced apart by a large number of integer units or "IBoxes" as better depicted in the illustration to the right of step 205. IBoxes will be defined shortly.

It should be noted in the above that the term "Bits Per Representative Inch" (BPI) is used to describe the resolution of intermediate grid 237 while the term "Dots Per Inch" (DPI) is used to define the physical resolution of the target display 107. The bits within memory unit 103 do not have any relevant physical separation between them. Instead, the addresses of individual bits define a logical distance. That logical distance comes to represent a physical distance between the dots that are placed on the physical display medium 107 when the image is physically displayed. Hence, "BPI" is used to denote the representative resolution of data stored within the memory unit while "DPI" is used to denote physical spacing on a physical display medium 107.

Data representing the outline (e.g. 132c) that is to be rendered is fetched at the next step 203 of FIG. 2.

In a next step 204, the coordinates of points $P_0$–$P_N$ in the fetched outline data 132c are scaled and grid fitted to the 600 BPI intermediate grid 237. "Grid fitting" means that each outline-defining point $P_0$–$P_N$ of obtained outline 132c is mapped to a corresponding position P'$_0$–P'$_N$ on intermediate grid 237 where the corresponding position P'$_0$–P'$_N$ has integer coordinate values along both the horizontal and vertical axes, 237x and 237y, of the intermediate grid.

By way of example, note that point $P_1$ maps to a corresponding point P'$_1$ at the intersection of dashed lines 238 and 239. Outline point $P_0$ maps to a corresponding point P'$_0$ at the intersection of dashed lines 238 and 249. Grid fitting is typically carried out by truncating less significant bits or digits of a high precision signal representing the scaled coordinates P'$_0$–P'$_N$ of the outline defining points on the intermediate grid 237. Grid fitting may alternatively be carried out by way of rounding out the scaled numbers.

"Scaling" refers to that part of the scaling and grid fitting process 204 that defines the physical distance between rendered points such as P'$_0$ and P'$_1$. If one wished to render outline 132c at 10 printer points, the distance between the coordinates of P'$_0$ and P'$_1$ would represent a first distance, whereas if one wished to render outline 132c at 14 printer points, the distance between the coordinates of points P'$_0$ and P'$_1$ would represent a larger second value.

Those skilled in the art will recognize that the scaling and grid fitting process 204 can also include rotation and dis-placement relative to the printers em square. If rotation is performed, lines that are perfectly vertical and horizontal in the obtained outline 132c may become slanted when mapped onto the intermediate grid 237. Lines that are slanted in the outline 132c may likewise become perfectly vertical or horizontal. For sake of simplicity, it is assumed here that no rotation occurs. Line P'$_0$–P'$_1$ therefore remains perfectly vertical in intermediate grid 237 and line P'$_1$–P'$_2$ remains perfectly horizontal. The scaled and grid fitted outline on intermediate grid 237 is now referred to as intermediate outline 232c.

In a next step 205 the interior of intermediate outline 232c is filled. Each pixel (bit) of the intermediate grid 237 that is deemed to be inside intermediate outline 232c is set to a logic true ("1") and each pixel (bit) which is deemed to lie outside of the outline is set to logic false ("0"). A variety of pixel-fill algorithms are known the art and will not be discussed here. The pixels of the intermediate grid are depicted as "IBoxes". Logic true IBoxes are shaded while logic false IBoxes are left unshaded. The filled intermediate grid is now referenced as 237'.

For purposes of illustrative simplicity, not all IBoxes that should be shaded are so shaded in FIG. 2 following step 205. Instead, a zoomed-in partial view of the result is shown. Point P'$_9$ for example, is understood to lie out to the right beyond the illustrated right side cut-edge of intermediate grid 237'. All IBoxes lying directly above the line connecting points P'$_0$ and P'$_9$ are understood to be shaded (filled) although this is not shown.

It is seen in this magnified, partial view of the intermediate grid 237' following step 205, that the IBoxes to the right of and below outline point P'$_1$ are shaded. IBoxes to the right of and above point P'$_0$ are also shaded. This defines the left edge of the illustrated capital-R outline 232c.

For purposes of further discussion, the first three IBoxes below and to the right of point P'$_1$ are referenced as IBox1, IBox2 and IBox3. The next immediately underlying boxes are referenced as IBox4, IBox5 and IBox6. Similarly, the first three shaded boxes in the third row are referenced as IBox7, IBox8 and IBox9.

In a next step 206, a yet-unfilled template 137" of the target grid (300 BPI) is projected over the filled intermediate grid 237'. This step 206 is, of course, conceptually carried out by the digital processing unit (CPU) 101 as it carries out conversion process 200. If an analogy had to be made to tangible objects, one might think of intermediate grid 237' (600 BPI) as an opaque graph paper having dashed lines such as 238, 239 and 249 forming the graph gridwork. The overlaid target grid template 137" may be thought of as a transparent, cellophane graph template having a graphing gridwork made of boxes (TBoxes) which are twice as large in each direction as the boxes (IBoxes) of the intermediate grid 237'.

The combination of the underlying, filled intermediate grid 237' and the overlying target grid template 137" is referred to as an overlay combination 437.

Referring to overlay combination 437, the outlines of the TBoxes are drawn with wide lines to distinguish them from the narrow-width outlines of the IBoxes. Note that each TBox fits squarely over four underlying IBoxes. For sake of discussion, the TBox containing IBox1 is referenced as TBox1; the TBox containing IBox2 is referenced as TBox2; the TBox containing IBox4 is referenced as TBox4; the TBox containing IBox5 is referenced as TBox5.

Overlay step 206 does not take into account the alignment of specific outline points such as P'1 to a corner of a TBox.

Thus, it is quite possible that point P'1 will align to the center of TBox1 as shown. Note that TBox1 contains only one shaded IBox, namely IBox1. TBoxes 2 and 4 each contain two shaded IBoxes. TBox5 contains four shaded IBoxes.

In a next step 207, each TBox is inspected (sampled) by the DPU 101 and a determination is made as to what percentage of the area of each TBox is covered by shaded IBoxes. That percentage then becomes a grayscale value that is attached by the DPU 101 to the inspected TBox.

Thus, in the illustrated example where corner point $P'_1$ happens to have been mapped to the center of TBox1, there is only one out of four set (shaded) IBoxes in TBox1 and TBox1 accordingly receives a grayscale value of 25%. For similar reasons, TBox2 receives a grayscale value of 50% and TBox4 receives a grayscale value of 50%. TBox5 is filled with four out of four set (shaded) IBoxes and TBox5 accordingly receives a grayscale value of 100%. The remaining TBoxes are assigned grayscale values in a similar manner.

The overlay grid template 137'' which now has these grayscale values written into each of its TBoxes now becomes the target grid 137 previously described with reference to FIG. 1. The grayscale values are represented by bit patterns written into the region of memory unit 103 that stores target grid 137.

In a next step 208, the contents of the buffer representing the grayscale-filled target grid 137 are transferred to a rendering unit 105 for rendering the corresponding bit-mapped image.

The simple conversion process 200 works nicely for providing anti-aliasing effects at slanted edge portions such as $P_6$–$P_7$ (FIG. 1) of a to-be rendered outline. However, the same process can work disadvantageously at vertical and horizontal edges of the image if a scaled end point (e.g., point $P'_1$ in FIG. 2) of a horizontal or vertical edge does not align perfectly with a corner of a TBox. When this happens, the vertical and/or horizontal edges that have such a non-aligned end point unintentionally attain a fuzzy or non-crisp appearance due to the grayscaling process. The human eye perceives these edges as being slightly out of focus and strains to bring them into focus. This becomes annoying to a reader, and is thus undesirable.

Ideally, each vertical or horizontal edge of a rendered character or other glyph should be crisp, and provide a clear, sharp distinction over the background intensity.

Figure 3:
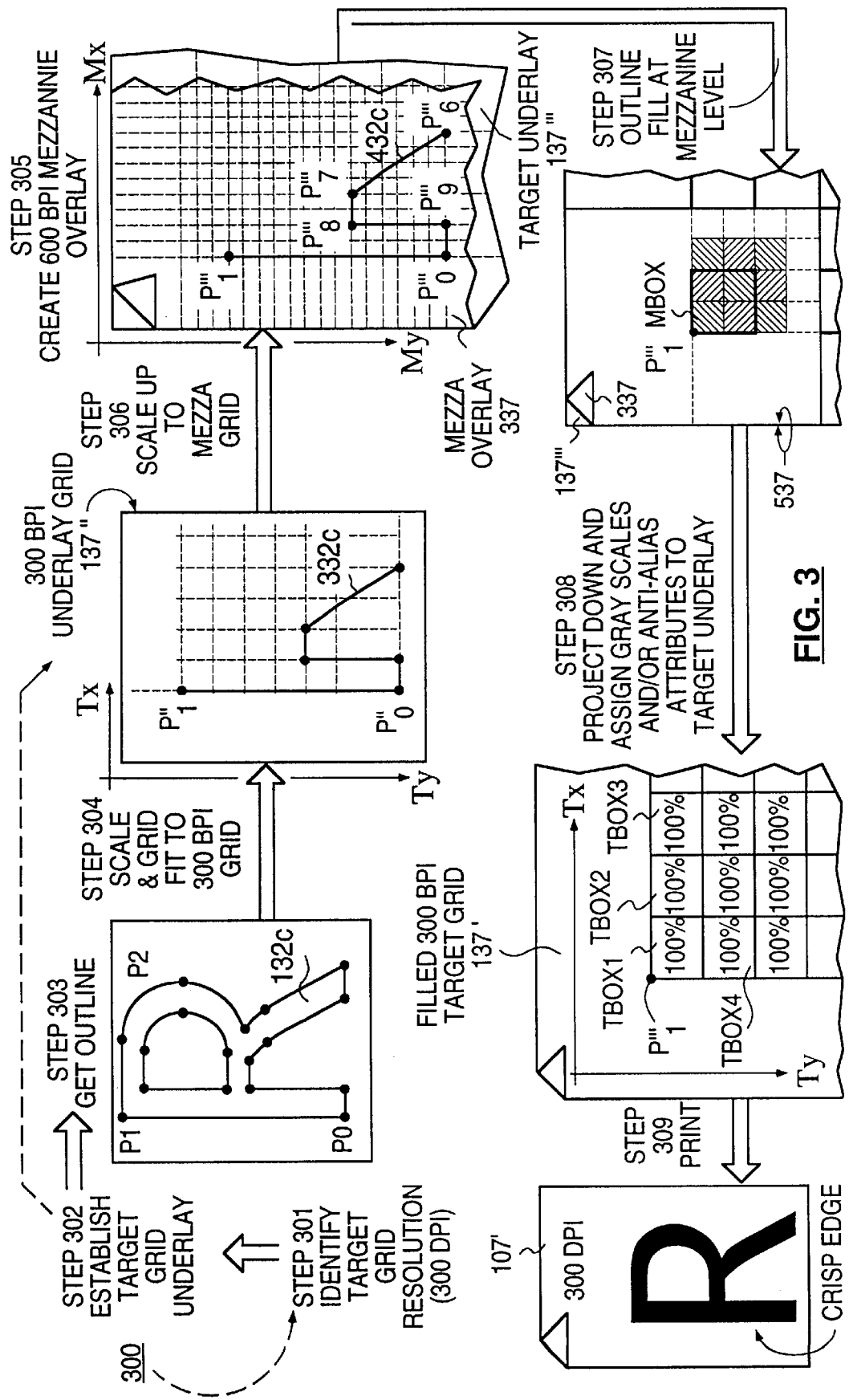
FIG. 3 is a process flow diagram illustrating a conversion in accordance with the invention that solves the grid alignment problem.

FIG. 3 shows a modified conversion process 300 in accordance with the invention. Like reference symbols in the "300" number series are used to denote elements of FIG. 3 which have corresponding, but not necessarily similar, elements numbered in the "200" series in FIG. 2. This modified conversion process 300 provides automatic snap alignment of vertical and horizontal edges of the bit-mapped image to integer coordinates of the target grid 137' and thereby eliminates the annoyingly fuzzy or non-crisp quality that process 200 (FIG. 2) gave to such edges.

At step 301, the resolution of the target grid is identified. For purposes of this example, it is assumed again that the target grid resolution is 300 DPI.

At step 302, a buffer representing a target grid underlay 137''' is established in the memory space of memory unit 103'. Unlike the intermediate grid 237 of FIG. 2, the target grid underlay 137''' of FIG. 3 has a resolution (e.g. 300 BPI) matching the resolution to be provided by the targeted, bit-mapped rendering unit 105. This resolution was identified in step 301.

At step 303, data representing a desired outline 132c is fetched.

At step 304, the fetched outline data 132c is scaled and grid fitted onto the target grid underlay 137'''. The scaled and grid fitted outline is now referenced as 332c. The outline-defining points of outline 332c are referenced as points $P''_0$ through $P''_N$. Note that the outline-defining points $P''_0$–$P''_N$ all have integer coordinate values on the horizontal and vertical axes, Tx and Ty, of the target grid underlay 137'''.

At step 305, a buffer representing a mezzanine overlay grid 337 is created. The mezzanine overlay grid 337 has a higher resolution than the resolution of the target grid underlay 137'''. The resolution of the mezzanine overlay 337 is an integer multiple of the resolution of the target grid underlay 137'''.

By way of example, if the resolution of the target grid underlay 137''' is $r_{Tx}$=300 BPI and $r_{Ty}$=300 BPI, then a resolution increase factor of two would result in a mezzanine overlay grid 337 having respective resolutions of $r_{Mx}$=600 BPI and $r_{My}$=600 BPI. The resolution increase factor does not have to be the same for the horizontal and vertical axes. One of the axes of the mezzanine overlay grid 337 can even have the same resolution as the counterpart axis of the target grid underlay 137'''.

In a subsequent step 306, the outline 332c of target grid underlay 137''' is scaled upwardly so as to be mapped onto the mezzanine overlay grid 337. Since the X and Y axis resolution-increase factors are both integers, no grid fitting step is required. (The scale-up is by integer scaling factors.) The new outline on mezzanine overlay grid 337 is now referenced as 432c. The coordinates of the scaled-up outline-defining points on mezzanine overlay grid 337 are now referenced as $P'''_0$–$P'''_N$. Since the X and Y axis resolution increase factors are both integers, points $P'''_0$–$P'''_N$ will automatically have coordinates which are integer values along the horizontal and vertical axes, Mx and My, of the mezzanine overlay grid 337.

It is to be understood that the above-mentioned steps 301–306 are carried out by the data processing unit (DPU) 101 manipulating physical data signals in memory unit 103'. Conceptually speaking, the above steps 301–306 can be analogized to: (a) obtaining an opaque graph paper (137''') that is to serve as an underlay, with the graph paper having graph boxes of a first size and positioning the outline defining points $P''_0$–$P''_N$ precisely at corner points of the graph boxes; (b) obtaining a transparent graph template (337) having smaller graph boxes, the smaller graph boxes being scaled such that an integer number of small graph boxes tile into each larger graph box of the opaque underlay graph paper (137'''); (c) laying the transparent overlay template (337) on top of the opaque underlay graph paper (137''') such that the smaller graph boxes of the transparent overlay tile into each of the larger graph boxes of the opaque underlying graph paper (137'''); and (d) tracing the outline 332c onto the overlying transparent graph paper (337) so as to create a new outline 432c having outline points $P'''_0$–$P'''_N$ lying precisely over the corners of the larger graph boxes in the opaque underlay (137''') and preferably, also lying precisely at corners of the smaller graph boxes in the transparent overlay (337).

In a next step 307, the interior of the up-scaled outline 432c is filled.

Next, a projection of the shaded mezzanine boxes (MBoxes) are projected down to the TBoxes of the underlying target grid 137'''. The projection is inspected by the DPU 101 and a grayscale and/or other anti-aliasing attribute value is assigned to each TBox of the underlying target grid 137''' based on the projection and inspection.

With anti-aliasing attribute values thus assigned to each TBox of grid 137''', the underlying target grid 137''' now becomes the novel target grid 137' of FIG. 1. Horizontal and vertical edges of outline 432c automatically snap fit into alignment with integer coordinates of the target grid 137'. This occurs because corner points such as $P''_1$ for example, start off being precisely aligned to corners of the TBoxes in the target grid 137' at the time that such points are projected onto the mezzanine overlay grid 337. As such, a 100% grayscale value is automatically assigned to TBoxes lying at horizontal and/or vertical edges of the up-scaled outline 432c. And such edges automatically obtain a sharp, crisp appearance.

It will be appreciated that grayscale values less than 100% will still attach to TBoxes at slanted edges to provide an anti-aliasing effect even though this is not shown in FIG. 3.

At step 309, the grayscaled data of target grid 137' is transferred to one or more of the bit-mapped rendering units 105 (FIG. 1) for rendering an image to be viewed by observer 109.

It is to be understood that, although the above discussion uses language referring to the creation of overlays and underlays, that these activities actually consume physical space in a physical memory unit (103). A first data storage buffer (Buff#1, not shown) is used to store the control points $P''_0$ through $P''_N$ in the first scaled and grid fitted outline 332c. A second data storage buffer (Buff#2, not shown) may be used to store the control points $P'''_0$–$P'''_N$ of the second outline 432c that is formed on the mezzanine overlay grid 337 of FIG. 3. A third data storage buffer (Buff#3, not shown) is used to store bits representing the "filled" and "unfilled" states of the mezzanine boxes (MBoxes) produced by step 307. A fourth data storage buffer (Buff#4, not shown) may be used to store bits representing the grayscale or other anti-aliasing attributes assigned to the TBoxes of the target grid 137' by step 308.

In light of this, it should be recognized that the modified conversion process 300 of FIG. 3 has one minor disadvantage when compared against the simple conversion process 200 of FIG. 2. It tends to consume more memory. In simple conversion process 200, memory space is consumed by one data storage buffer for defining the control points $P'_1$–$P'_N$ of intermediate outline 232c. Another data storage buffer consumes memory space for holding bits representing the "filled" and "unfilled" states of the intermediate boxes (IBoxes) produced by outline fill step 205 (FIG. 2). And yet another data storage buffer is used to store bits representing the grayscale attributes assigned to the TBoxes of the target grid 137 by step 207.

Thus a total of three data storage buffers are used for the simple conversion process 200 of FIG. 2 while as many as four data storage buffers may be used in the modified conversion process 300 of FIG. 3. The specific differences in memory consumption will depend on the number of control points $P_0$–$P_N$, the scaling factor used for step 204 (FIG. 2) and the X and Y scale up factors used for step 306 (FIG. 3). Also, as will be explained shortly, the modified conversion process 300 of FIG. 3 is compatible with anti-aliasing techniques other than grayscaling (see FIG. 4). Additional memory space might be consumed for storing bits representing the "other" anti-aliasing attributes assigned by step 308.

While the memory consumption of the modified conversion process 300 of FIG. 3 has been described above in the context of four data storage buffers, those skilled in the art will recognize that a variety of memory conservation techniques may be employed to reduce actual memory needs. Two entirely separate regions of memory unit 103' do not have to be consumed to support the bits representing outlines 332c and 432c. The buffer which holds the definitions for outline 332c may be overwritten with the definitions for the up-scaled outline 432c as each outline point $P''_0$–$P''_N$ is converted into a corresponding scaled-up point $P'''_0$–$P'''_N$. Thereafter the memory space consumed for storing the scaled-up points $P'''_0$–$P'''_N$ can be overwritten with the bits representing the "filled" and "unfilled" states of the mezzanine boxes (MBoxes) produced by step 307. And then, the memory space consumed for storing bits representing the filled mezzanine outline can be overwritten with the bits representing the anti-aliasing attribute values that are assigned to each TBox of grid 137''' as inspection (sampling) and assignment occur. Care must be taken, however, to assure that overwriting does not occur in areas containing data that is still needed for further processing.

Since Buff#3 (which stores the filled mezzanine outline) can be quite large if large up-scaling factors are used in step 305 (FIG. 3), it is believed to be preferable to reserve one common area for Buff#1 and Buff#2 while reserving a separate and second common area for Buff#3 and Buff#4.

Aside from buffer overwrite techniques, it is to be understood that other memory conserving techniques such as data compression and decompression may be employed to minimize the storage capacity required of memory unit 103'. Such techniques do not relate directly to the present invention, are well known in the art, and as such, will not be detailed here.

Figure 4:
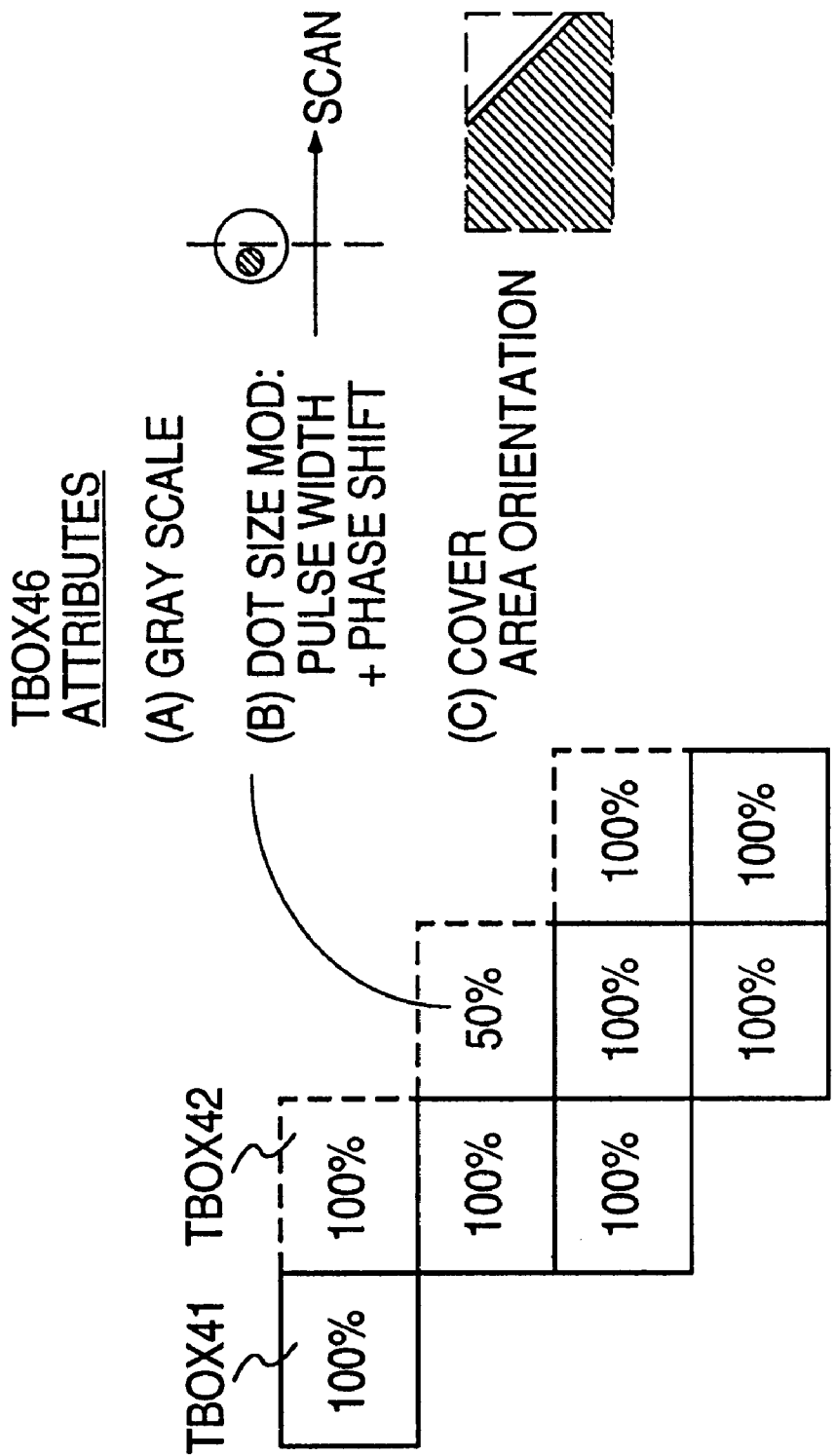
FIG. 4 is a diagram for explaining how the process of FIG. 3 is compatible with grayscale and other anti-aliasing techniques.

As already hinted, the modified conversion process 300 is compatible not only with grayscaling forms of anti-aliasing, but also with other forms. FIG. 4 is used to explain how grayscale and/or other anti-alias attributes may be assigned to TBoxes of slanted edge portions.

Referring to FIG. 4, assume that boxes containing the 100% markers lie on the right slanted edge of the right leg of our now-familiar capital-R glyph. When grayscaling is used, target grid boxes such as TBox-41 and TBox-42 have all their overlying mezzanine boxes (MBoxes) set to logic true ("1"), and as such receive a 100% grayscale value. Target boxes such as TBox-46 have less than all their overlying MBoxes set to logic true ("1") and some of their overlying MBoxes set to logic false ("0"). As such, they receive a less than 100% grayscale value (e.g. 50%).

The number and positioning of "filled" MBoxes within each TBox can be used to provide anti-aliasing through a number of different mechanisms which complement or are used as alternatives to grayscaling. The mezzanine outline fill step 307 of the present invention is compatible with these other technologies as well. This compatibility is preferably provided by using X and Y up-scaling factors of 3-times, 4-times or greater in the mezzanine creating step 305. Then, the distribution of "filled" MBoxes within each TBox can be used to select one or more anti-aliasing attributes from a group of attributes that includes (a) intensity control, (b) dot size modulation and/or dot position shifting and (c) partial covering of a target pixel coupled with asymmetric orientation of the cover area.

By way of example, some laser printers employ dot size modulation optionally coupled with horizontal displacement of a reduced-size dot within the area of a maximum dot. This is achieved through pulse width modulation and phase modulation of the turn/on or turn/off pulses applied to the laser beam mechanism. If the phase angle is kept at zero and pulse width is reduced, smaller and smaller dots appear at the center of the area of a maximum sized dot due to reduction of beam intensity. (Beam intensity typically has a Gaussian distribution function with maximum intensity at the center followed by either rapid or gradual decrease to a subthreshold level as one moves radially away from the center.) When the phase angle is changed, the smaller dot moves off center, left or right, usually to overlap with the dot formed by a previous or next pulsing of the laser beam. When this type of technology is used, the pulse width may be set in accordance with the number of MBoxes that fill each TBox. The phase angle may be set in accordance with the relative densities of turned-on MBoxes on the left side and right side of each TBox. (The dot size/placement modulation scheme is shown symbolically in FIG. 4 as a small-sized, shaded circle placed off center within a larger unshaded area. Those skilled in the art will recognize this to be mostly symbolic. More commonly, the radially-varying intensities of adjoining dots combine to create a desired anti-aliasing effect.)

Another technology that is coming under consideration is a so-called "cover-area selection" process. In this process, one is permitted to choose a full paint of each pixel area on the display medium or no paint. Alternatively, one may choose a diagonal half paint with any one of four corners of the pixel rectangle being selected as the unpainted corner. Similarly, 75% covering of the pixel area may be provided with one of four corners being chosen as the corner having the 25% non-covered area. The distribution and numbers of the set true ("1") MBoxes in the mezzanine overlay grid 337 (FIG. 3) may be used to decide which, if any, of an available number of cover area options is to be used for each TBox.

Referring back to FIG. 1, an image-rendering system 100' in accordance with the invention may accordingly be constructed to comprise (a) a storage means 103' for storing a set of plot instructions 132 for plotting an ideal outline 132*c* of a desired image, character or other glyph and for further storing conversion control instructions 134' for converting the plot instructions 132 into bit-mapped rendering instructions 137' compatible with a targeted, bit-mapped rendering apparatus and for further storing the bit-mapped rendering instructions 137'; and (b) data processing means 101 operatively coupled to the storage means 103' for carrying out the conversion control instructions 134'; wherein the combination of the data processing means 101 and the conversion control instructions 134' defines: (c) target identifying means for (step 301) identifying a target resolution to be provided by the targeted, bit-mapped rendering apparatus; (d) first scaling means for (step 304) scaling and grid-fitting the outline data 132 to a target grid underlay 137''' having the identified target resolution; (e) second scaling means for (step 306) upwardly scaling the grid-fitted outline data 332*c* of the target grid underlay 137''' to a mezzanine grid overlay 337 having a resolution level that is higher than the resolution of the target grid underlay 137'''; (f) outline filling means for (step 307) filling the outline 432*c* of the mezzanine grid 337 as defined by the second scaling means; and (g) assigning means for (step 308) assigning, based on the mezzanine level outline fill produced by the outline filling means, one or more of a grayscale value, dot size value, cover area value, asymmetrical orientation value (FIG. 4) and/or other anti-aliasing attribute value to each corresponding pixel of the target grid 137'; and further wherein the image-rendering system 100' includes (h) rendering means 105 for (step 309) rendering the image in accordance with said anti-aliasing assignment onto a target display medium 107 for appreciation by a human observer 109.

Given the above, those skilled in the art can readily program a microcomputer or other data processing unit (DPU) to carry out the described steps. It is, of course, understood that the above-described steps do not need to be all executed by a computer program. Dedicated hardware circuits may be constructed to carry out some or all of the described steps. What is important in the end is that the observer of the resultant image sees anti-aliasing effects in slanted and/or curved edges in combination with crisp or sharp appearances at horizontal and/or vertical edges of the displayed image.

The above disclosure is to be taken as illustrative of the invention, not as limiting its scope or spirit. Numerous modifications and variations will become apparent to those skilled in the art after studying the above disclosure.

Given the above disclosure of general concepts and specific embodiments, the scope of protection sought is to be defined by the claims appended hereto.

What is claimed is:

1. An apparatus for converting outline data into bit-mapped image data having anti-aliasing attributes, where the bit-mapped image data is to be rendered by a pre-specified bit-mapped rendering unit at a pre-specified resolution, said apparatus comprising:

(a) data storage means for storing data, wherein the stored data includes:

(a.1) plot instruction data for plotting a desired outline of an image to be rendered, (a.2) target outline data defining a first plot of the desired outline, scaled and grid fitted onto a target grid, (a.3) mezzanine outline data defining a second plot of the desired outline, upwardly scaled from the target grid onto a mezzanine grid, and (a.4) the bit-mapped image data with said anti-aliasing attributes; and (b) data processing means, operatively coupled to and in cooperation with the data storage means, for:

(b.1) identifying as a target resolution the resolution at which the pre-specified bit-mapped rendering unit is to render the bit-mapped image data;

(b.2) establishing within said storage means, a target data buffer representing a target grid having a gridwork of pixels and coordinates corresponding to the identified target resolution;

(b.3) fetching from said storage means, plot instruction data for plotting a desired outline;

(b.4) scaling and grid fitting the fetched plot instruction data to the coordinates of the target grid and thereby creating target outline data representing a corresponding target grid outline;

(b.5) establishing within said storage means a mezzanine buffer representing a mezzanine grid having a gridwork of pixels and coordinates corresponding to a mezzanine resolution that is higher than the resolution of the target grid;

(b.6) upwardly scaling the coordinates of the target outline data to the mezzanine resolution of the mezzanine grid and thereby creating mezzanine level outline data representing the scaled-up target outline data;

(b.7) filling in the pixels of the mezzanine level outline by setting representative bits in the mezzanine buffer; and (b.8) assigning, based on the bits set in the mezzanine buffer, one or more anti-aliasing attributes to each pixel of the target display grid by writing to the target data buffer for thereby producing bit-mapped image data having a desired anti-aliasing effect.

2. An apparatus according to claim 1 wherein the data processing means in cooperation with the data storage means further provides for:

(b.9) transferring the bit-mapped image data having the one or more anti-aliasing attributes to the bit-mapped rendering unit for thereby rendering the bit-mapped image with the desired anti-aliasing effect onto a target medium.

3. An apparatus according to claim 2 wherein the bit-mapped rendering unit includes a laser printing mechanism capable of printing variable sizes of dots and the anti-aliasing attributes control the size of each dot generated by the laser printing mechanism.

4. An apparatus according to claim 2 wherein the bit-mapped rendering unit includes means for controlling the intensity of dots on a cathode ray tube and the anti-aliasing attributes control the intensity of dots generated on the cathode ray tube.

5. An apparatus according to claim 1 wherein the one or more anti-aliasing attributes are selected from a group of anti-aliasing attributes consisting of: a grayscale value, a dot size value, a cover area value and an asymmetrical orientation value assignable to each pixel of the target display grid.

6. An apparatus for converting outline data into bit-mapped image data, where the bit-mapped data is to be transferred to a bit-mapped rendering unit having a pre-specified resolution and rendered thereby onto a target medium, said apparatus comprising:

(a) data storage means for storing data and outline data for a plurality of images where the outline data for an image includes plot instructions;

(b) target identifying means for identifying a target resolution to be provided by the bit-mapped rendering unit;

(c) target grid establishing means for establishing within said storage means a target grid having a gridwork of pixels and coordinates corresponding to the target resolution identified by the target identifying means;

(d) outline fetching means for fetching from said storage means plot instructions for plotting a desired outline;

(e) first scaling means for scaling and grid fitting the desired outline to the coordinates of the target grid established by the target grid establishing means and thereby creating a corresponding target grid outline;

(f) mezzanine grid establishing means for establishing within said storage means a mezzanine grid having a gridwork of pixels and coordinates corresponding to a mezzanine resolution that is higher than the resolution of the target grid;

(g) second scaling means for upwardly scaling the coordinates of the target grid outline to the mezzanine resolution level and thereby creating mezzanine level outline data representing a scaled-up outline;

(h) mezzanine outline filling means for filling in the pixels of the mezzanine level outline with fill; and (i) assigning means for assigning, based on the fill of the mezzanine level outline pixels, one or more anti-aliasing attributes to each pixel of the target grid for producing bit-mapped image data having a desired anti-aliasing effect.

7. An apparatus according to claim 6 further comprising:

(j) render actuating means for transferring the bit-mapped image data having the one or more anti-aliasing attributes to the bit-mapped rendering unit thereby initiating rendering of the bit-mapped image data with the desired anti-aliasing effect onto the target medium.

8. An apparatus according to claim 7 wherein the bit-mapped rendering unit includes a laser printing mechanism capable of printing variable sizes of dots and the anti-aliasing attributes control the size of each dot generated by the laser printing mechanism.

9. An apparatus according to claim 7 wherein the bit-mapped rendering unit includes means for controlling the intensity of dots on a cathode ray tube and the anti-aliasing attributes control the intensity of dots generated on the cathode ray tube.

10. An apparatus according to claim 6 wherein the one or more anti-aliasing attributes are selected from a group of anti-aliasing attributes consisting of: a grayscale value, a dot size value, a cover area value and an asymmetrical orientation value assignable to each pixel of the target display grid.

11. A computer method for converting outline data in a memory into bit-mapped image data, where the bit-mapped data is to be transferred to a bit-mapped rendering unit having a pre-specified resolution for rendering an image onto a target medium, said method comprising the steps of:

(a) defining and storing in the memory a set of plot instructions for plotting an ideal outline of a desired image, character or other glyph, the outline including one or more outline points through which a closed contour passes;

(b) identifying a target resolution to be provided by the bit-mapped rendering unit;

(c) scaling and grid-fitting an outline retrieved from the memory to the identified target resolution;

(d) upwardly scaling the grid-fitted outline to a mezzanine resolution level that is higher than the identified target resolution to form a mezzanine outline;

(e) filling the mezzanine outline at the mezzanine resolution level with fill; and (f) assigning, based on the fill of the mezzanine outline, one or more anti-aliasing attributes to pixels of a target display grid and thereby producing bit-mapped image data having a desired anti-aliasing effect.

12. A computer method according to claim 11 further comprising the step of:

(g) rendering an image in accordance with the bit-mapped image data onto the target medium for viewing by a human observer.

13. A computer method according to claim 12 wherein said step of rendering includes the steps of:

(g1) using a laser printing mechanism capable of printing variable sizes of dots; and (g2) controlling the size of dots generated by the laser printing mechanism as a function of the anti-aliasing attributes assigned to the pixels.

14. A computer method according to claim 12 wherein said step of rendering includes the steps of:

controlling the intensity of dots on a cathode ray tube as a function of the anti-aliasing attributes for each of the dots.

15. An computer image rendition method for rendering a bit-mapped image having anti-aliasing effects onto a target grid from a supplied set of plot instructions stored in memory for an image wherein the plot instructions define a plotting of an ideal outline of the image to be rendered, said method including the steps of:

forming target outline data defining a first plot of the ideal outline, scaled and grid fitted onto a target grid, and forming mezzanine outline data defining a second plot of the desired outline, upwardly scaled from the target outline data onto a mezzanine grid, wherein plural grid boxes of the mezzanine grid tile perfectly into each grid box of the target grid.

16. A computer implemented method for rendering an image by a unit having a first resolution onto a medium in response to a bitmap generated for the image by a computer, said computer implemented method comprising the steps of:

(a) storing, in a memory, outline data for a plurality of images where the outline data for each image includes a set of plot instructions for plotting from a specified reference point an ideal outline of an image where the outline of the image includes one or more outline points through which a closed contour passes;

(b) identifying the resolution of a unit which will produce an image onto the medium in response to a bitmap for the image;

(c) generating a target grid in the storage where the target grid has a location resolution equal to the identified resolution of the unit where each location in the target grid is represented by a plurality of bits for assigning more than two values for each location in the target grid so as to include anti-aliasing attributes in the value for each location in the target grid and where a location of the target grid represents a bit in the bitmap generated by the apparatus;

(d) recovering from memory outline data for a selected image;

(e) scaling and fitting the outline data as a function of the resolution of the unit to create target outline data for the selected image such that each outline point is located at an integer location on the target grid;

(f) projecting the outline of the selected image from the target outline data onto the target grid;

(g) generating a mezzanine grid in the memory where the target grid is enlarged by an integer scaling factor in at least one dimension such that at least two bits in the mezzanine grid are associated with each bit in the target grid;

(h) scaling the target outline data as a function of the integer scaling factor used in step (g) for the same dimensions as enlarged in step (g) to create mezzanine outline data for the selected image;

(i) projecting the outline of the selected image from the mezzanine outline data onto the mezzanine grid where the projected outline of the selected image on the mezzanine grid has the same relative position as the projected outline of the selected image on the target grid;

(j) assigning a value to each bit in the mezzanine grid as a function of the location of the bit in the mezzanine grid to the location of the outline of the selected image projected onto the mezzanine grid; and (k) assigning and storing in the target grid a value to each bit in the target grid as a function of the value assigned to the two or more bits in the mezzanine grid associated with a bit in the target grid such that the value assigned to a bit in the target grid includes anti-aliasing attributes.

17. The computer implemented method of claim 16 further comprising the step of:

(l) transferring the contents of the target grid as the bitmap for the selected image to the unit for displaying the selected image by the unit.

18. The computer implemented method of claim 16 wherein step (c) further comprises the step of:

generating a target grid having a horizontal dimension and a vertical dimension.

19. The computer implemented method of claim 18 wherein step g further comprises the step of:

enlarging the target grid in only the horizontal direction by the integer scaling factor.

20. The computer implemented method of claim 18 wherein step g further comprises the step of:

(g2) enlarging the target grid in only the vertical direction by the integer scaling factor.

21. The computer implemented method of claim 18 wherein step g further comprises the step of:

(g3) enlarging the target grid in both the vertical and horizontal directions by the same integer scaling factor.

22. The computer implemented method of claim 18 wherein step further comprises the steps of:

enlarging the target grid in the vertical direction by a first integer scaling factor and in the horizontal direction by a second integer scaling factor where the first integer scaling factor is different in value than the second integer scaling factor.

23. The computer implemented method of claim 16 wherein step (k) further includes the step of:

assigning a value to the plurality of bits representing each bit in the target grid to include values for anti-aliasing attributes selected from a group of anti-aliasing attributes consisting of: a grayscale value, a dot size value, a cover area value and an asymmetrical orientation value.

24. An apparatus for generating a bitmap for an image for use by a unit having a first resolution for displaying the image onto a medium, said apparatus comprising:

storage means for storage data where the stored data includes outline data for a plurality of images where the outline data for each image includes a set of plot instructions for plotting from a specified reference point an ideal outline of an image where the outline of the image includes one or more outline points through which a closed contour passes;

data processing means connected to the storage means and, under program control, performs the function of:

identifying the resolution of a unit which will produce an image onto the medium in response to a bitmap for the image;

generating a target grid in the storage means where the target grid has a location resolution equal to the identified resolution of the unit where each location in the target grid is represented by a plurality of bits for assigning more than two values for each location in the target grid so as to include anti-aliasing attributes in the value for each location in the target grid and where a location of the target grid represents a bit in the bitmap generated by the apparatus;

recovering from the storage means outline data for a selected image;

scaling and fitting the outline data to the target grid for creating target outline data for the selected image as a function of the resolution of the unit such that each outline point in the outline data is located at an integer location on the target grid;

generating a mezzanine grid in the storage means by enlarging the target grid by an integer scaling factor in at least one dimension where location in the mezzanine grid is represented by one bit in the storage means such that at least two locations in the mezzanine grid are associated with a location in the target grid;

scaling the target outline data in the same dimensions and by the same integer scaling factor used to create the mezzanine grid;

projecting the outline of the selected image from the mezzanine outline data onto the mezzanine grid where the projected outline of the selected image on the mezzanine grid has the same relative position as the outline of the selected image generated from the target outline data would have if projected onto the target grid;

assigning and storing in the storage means a value to each bit in the mezzanine grid as a function of the location of the bit in the mezzanine grid relative to the location of the outline of the selected image projected onto the mezzanine grid; and assigning and storing in the storage means values to the plurality of bits for each location in the target grid as a function of the value assigned to the two or more bits in the two or more locations of the mezzanine grid associated with a location in the target grid such that the value assigned to bits for a location in the target grid includes anti-aliasing attributes.

25. The apparatus of claim 24 wherein the data processing means further provides the function of:

transferring the contents of the target grid as the bitmap for the selected image to the unit for displaying the selected image by the unit.

26. The apparatus of claim 24 wherein the data processing means further provides the function of:

generating a target grid having a horizontal dimension and a vertical dimension.

27. The apparatus of claim 26 wherein the data processing means further provides the function of:

enlarging the target grid in only the horizontal direction by the integer scaling factor to form the mezzanine grid.

28. The apparatus of claim 26 wherein the data processing means further performs the function of:

enlarging the target grid in only the vertical direction by the integer scaling factor to form the mezzanine grid.

29. The apparatus of claim 26 wherein the data processing means further performs the function of:

enlarging the target grid in both the vertical and horizontal directions by the same integer scaling factor to form the mezzanine grid.

30. The apparatus of claim 26 wherein the data processing means further performs the function of:

enlarging the target grid in the vertical direction by a first integer scaling factor and in the horizontal direction by a second integer scaling factor where the first integer scaling factor is different in value than the second integer scaling factor to form the mezzanine grid.

31. The apparatus of claim 24 wherein the data processing means further provides the function of:

assigning anti-aliasing attributes to each pixel represented by a bit in the target display where the anti-aliasing attributes are from a group of anti-aliasing attributes consisting of: a grayscale value, a dot size value, a cover area value and an asymmetrical orientation value.

* * * * *